(12) United States Patent
Lunati

(10) Patent No.: US 8,594,986 B2
(45) Date of Patent: *Nov. 26, 2013

(54) MULTI-SCALE FINITE VOLUME METHOD FOR RESERVOIR SIMULATION

(75) Inventor: Ivan Fabrizio Lunati, Zurich (CH)

(73) Assignees: Chevron U.S.A. Inc., San Ramon, CA (US); Schlumberger Technology Corporation, Houston, TX (US)

(*) Notice: Subject to any disclaimer, the term of this patent is extended or adjusted under 35 U.S.C. 154(b) by 335 days.

This patent is subject to a terminal disclaimer.

(21) Appl. No.: 12/496,218

(22) Filed: Jul. 1, 2009

(65) Prior Publication Data

US 2010/0004908 A1 Jan. 7, 2010

Related U.S. Application Data

(60) Provisional application No. 61/077,961, filed on Jul. 3, 2008.

(51) Int. Cl.
- *G06F 7/60* (2006.01)
- *G06F 17/10* (2006.01)
- *G06G 7/48* (2006.01)
- *G06G 7/50* (2006.01)

(52) U.S. Cl.
USPC ............. 703/10; 703/2; 703/6; 703/9

(58) Field of Classification Search
USPC .................................. 703/10, 6, 9, 2
See application file for complete search history.

(56) References Cited

U.S. PATENT DOCUMENTS

| 4,821,164 A | 4/1989 | Swanson |
|---|---|---|
| 5,321,612 A | 6/1994 | Stewart |

(Continued)

FOREIGN PATENT DOCUMENTS

| WO | WO99/52048 | 10/1999 |
|---|---|---|
| WO | WO99/57418 | 11/1999 |

(Continued)

OTHER PUBLICATIONS

Lunati, Ivan et al., "The Multi-Scale Finite Volume Method: A Flexible Tool to Model Physically Complex Flow in Porous Media", Sep. 7, 2006, 10th European Conference on the Mathematics of Oil Recovery.*

(Continued)

*Primary Examiner* — David Silver
*Assistant Examiner* — Cedric D Johnson
(74) *Attorney, Agent, or Firm* — Carlos Hanze; Tiffany Weksberg

(57) ABSTRACT

A multi-scale finite volume method for simulating a fine-scale geological model of subsurface reservoir is disclosed. The method includes providing a fine-scale geological model of a subsurface reservoir associated with a fine-scale grid, a coarse-scale grid, and a dual coarse-scale grid. A coarse-scale operator is constructed based on internal cells, edge cells, and node cells on the fine-scale grid that are defined by the dual coarse-scale grid. Pressure in the dual coarse-scale cells is computed using the coarse-scale operator. Pressure in the primary coarse-scale cells is computed using the computed pressure in the dual coarse-scale cells. A display is produced using the computed pressure in the primary coarse-scale cells. An iterative scheme can be applied such that the computed pressure in the primary coarse-scale cells converges to the fine-scale pressure solution and mass balance is maintained on the coarse-scale.

19 Claims, 5 Drawing Sheets

(56) References Cited

U.S. PATENT DOCUMENTS

| | | | |
|---|---|---|---|
| 5,663,928 | A | 9/1997 | De Bazelaire et al. |
| 5,729,451 | A | 3/1998 | Gibbs et al. |
| 5,923,329 | A | 7/1999 | Beale |
| 6,018,497 | A | 1/2000 | Gunasekera |
| 6,078,869 | A | 6/2000 | Gunasekera |
| 6,106,561 | A | 8/2000 | Farmer |
| 6,185,512 | B1 | 2/2001 | Lambrecht |
| 6,266,619 | B1 | 7/2001 | Thomas et al. |
| 6,631,202 | B2 | 10/2003 | Hale |
| 6,662,109 | B2 | 12/2003 | Roggero et al. |
| 6,721,694 | B1 | 4/2004 | Lambrecht et al. |
| 6,766,255 | B2 | 7/2004 | Stone |
| 6,826,520 | B1 | 11/2004 | Khan et al. |
| 7,480,206 | B2 | 1/2009 | Hill |
| 2002/0013687 | A1 | 1/2002 | Ortoleva |
| 2005/0177354 | A1* | 8/2005 | Jenny et al. ............... 703/10 |
| 2005/0273303 | A1 | 12/2005 | Flandrin et al. |
| 2006/0235667 | A1* | 10/2006 | Fung et al. ............... 703/10 |
| 2006/0277012 | A1 | 12/2006 | Ricard et al. |
| 2007/0010979 | A1* | 1/2007 | Wallis et al. ............... 703/10 |

FOREIGN PATENT DOCUMENTS

| | | |
|---|---|---|
| WO | WO00/79423 | 12/2000 |
| WO | WO01/06091 | 1/2001 |
| WO | WO01/27755 | 4/2001 |
| WO | WO01/27858 | 4/2001 |
| WO | WO02/06857 | 1/2002 |

OTHER PUBLICATIONS

Hajibeygi, Hadi et al. "Iterative Multi-Scale Finite-Volume Method", Jun. 28, 2008, Journal of Computational Physics 227, Elsevier Inc.*

Aarnes, Jorg Espen et al., "Coarsening of Three-Dimensional Structured and Unstructured Grids for Subsurface Flow", May 16, 2007, Advances in Water Resources 30, Elsevier Ltd.*

Zhou, H. et al., "Operator-Based Multiscale Method for Compressible Flow", Feb. 26-28, 2007, Society of Petroleum Engineers.*

Aarnes, J. E., Kippe, V., and Lie, K.A., Mixed Multiscale Finite Elements and Streamline Methods for Reservoir Simulation of Large Geomodels, Advances in Water Resources, Mar. 2005, pp. 257-271, vol. 28, Issue 3, Elsevier Ltd.

Arbogast, T., Numerical Subgrid Upscaling of Two-Phase Flow in Porous Media, Numerical Treatment of Multiphase Flows in Porous Media, Lecture Notes in Physics, 2000, vol. 552, pp. 35-49, Springer Berlin / Heidelberg.

Arbogast, T. and Bryant, S.L., Numerical Subgrid Upscaling for Waterflood Simulations, SPE Reservoir Simulation Symposium, Feb. 11-14, 2001, pp. 1-14, Paper No. 66375-MS, Society of Petroleum Engineers Inc., Houston, Texas.

Bratvedt, F., Gimse, T., and Tegnander, C., Streamline Computations for Porous Media Flow Including Gravity, Transport in Porous Media, Oct. 1996, pp. 63-78, vol. 25, No. 1, Springer Netherlands.

Busigin, A. and Phillip, C.R., Efficient Newton-Raphson and Implicit Euler Methods for Solving the HNC Equation, Molecular Physics,1992, pp. 89-101, vol. 76, Issue 1, Taylor & Francis, London.

Chen, Z. and Hou, T.Y., A Mixed Multiscale Finite Element Method for Elliptic Problems With Oscillating Coefficients, Mathematics of Computation, 2002, pp. 541-576, vol. 72, American Mathematical Society.

Chien, M.C.H., Wasserman, M.L., Yardumian, H.E., Chung, E.Y., Nguyen, T., and Larson, J., The Use of Vectorization and Parallel Processing for Reservoir Simulation, SPE Reservoir Simulation Symposium, Feb. 1-4, 1987, pp. 329-341, Paper No. 16025-MS, Society of Petroleum Engineers Inc., San Antonio, Texas.

Christie, M.A. and Blunt, M.J., Tenth SPE Comparative Solution Project: A Comparison of Upscaling Techniques, SPE Reservoir Simulation Symposium, Feb. 11-14, 2001, pp. 1-13, Paper No. 66599, Society of Petroleum Engineers Inc., Houston, Texas.

Durlofsky, L.J., Numerical Calculation of Equivalent Grid Block Permeability Tensors for Heterogeneous Porous Media, Water Resources Research, May 1991, pp. 699-708, vol. 27, No. 5, American Geophysical Union.

Durlofsky, L.J., A Triangle Based Mixed Finite Element-Finite Volume Technique for Modeling Two Phase Flow Through Porous Media, Journal of Computational Physics, Apr. 1993, pp. 252-266, vol. 105, Issue 2, Academic Press, Inc,.

Durlofsky, L.J., Jones, R.C., and Milliken, W.J., A Nonuniform Coarsening Approach for the Scale-Up of Displacement Processes in Heterogeneous Porous Media, Advances in Water Resources, Oct.-Dec. 1997, pp. 335-347, vol. 20, Issues 5-6, Elsevier Science Ltd.

Efendiev, Y.R., Hou, T.Y., and Wu, X.H., Convergence of a Nonconforming Multiscale Finite Element Method, SIAM Journal of Numerical Analysis, 2000, pp. 888-910, vol. 37, No. 3, Society for Industrial and Applied Mathematics.

Efendiev, Y.R. and Wu, X.H., Multiscale Finite Element for Problems With Highly Oscillatory Coefficients, Numerische Mathematik, Jan. 2002, pp. 459-486, vol. 90, No. 3, Springer Berlin / Heidelberg.

Fujiwara, K., Okamoto, Y., Kameari, A., Ahagon, A., The Newton-Raphson Method Accelerated by Using a Line Search-Comparison Between Energy Functional and Residual Minimization, IEEE Transactions on Magnetics, May 2005, pp. 1724-1727, vol. 41, No. 5, Institute of Electrical and Electronics Engineers, Inc. (IEEE).

Hou, T.Y. and Wu, X.H., A Multiscale Finite Element Method for Elliptic Problems in Composite Materials and Porous Media, Journal of Computational Physics, 1997, pp. 169-189, vol. 134, Academic Press.

Jenny, P., Wolfsteiner, C., Lee, S.H., and Durlofsky, L.J., Modeling Flow in Geometrically Complex Reservoirs Using Hexahedral Multi-Block Grids, SPE Reservoir Simulation Symposium, Feb. 11-14, 2001, pp. 1-10, Paper No. 66357, Society of Petroleum Engineers Inc., Houston, Texas.

Jenny, P., Lee, S. H., Tchelepi, H. A., Adaptive Multiscale Finite-Volume Method for Multiphase Flow and Transport in Porous Media, Sep. 24, 2004, Multiscale Modeling and Simulation, vol. 3, No. 1, pp. 50-64, Society for Industrial and Applied Mathematics.

Lee, S.H., Durlofsky, L.J., Lough, M.F., and Chen, W.H., Finite Difference Simulation of Geologically Complex Reservoirs With Tensor Permeabilities, SPE Reservoir Evaluation & Engineering, Dec. 1998, pp. 567-574, Society of Petroleum Engineers Inc.

Lee, S.H., Tchelepi, H., and Dechant, L.F., Implementation of a Flux-Continuous Finite Difference Method for Stratigraphic, Hexahedron Grids, SPE Reservoir Simulation Symposium, Feb. 14-17, 1999, pp. 1-11, Paper No. 51901, Society of Petroleum Engineers Inc., Houston, Texas.

Lunati, I. and Jenny, P., Multiscale Finite-Volume Method for Compressible Multiphase Flow in Porous Media, Journal of Computational Physics, Aug. 10, 2006, pp. 616-636, vol. 216, Issue 2, Elsevier Inc.

Oak, M.J., Baker, L.E., and Thomas, D.C., Three-Phase Relative Permeability of Berea Sandstone, Journal of Petroleum Technology (JPT), Aug. 1990, pp. 1054-1061, vol. 42, No. 8, Society of Petroleum Engineers.

Salibian-Barrera, M., Fast and Stable Bootstrap Methods for Robust Estimates, Interface Foundation Annual Meeting, 2002, pp. 1-14, Montreal, QC.

Shi, G. and Liu, X., Multi-Parameter Accelerated Modified Newton—Raphson Methods for Rigid-Plastic FE Analysis, Acta Mechanica Solida Sinica, Dec. 2002, pp. 323-331, vol. 15, No. 4, DOI 10.1007/BF02493033, the Chinese Society of Theoretical and Applied Mechanics, Beijing, China.

Tesch, J., The Newton-Raphson Method and Its Application to Fixed Points, Nov. 21, 2005, Center for Hybrid and Embedded Software Systems at the University of California, Berkeley, Berkeley, California.

Wallstrom, T.C., Hou, S., Christie, M.A., Durlofsky, L.J. and Sharp, D.H., Application of a New Two-Phase Upscaling Technique to Realistic Reservoir Cross Sections, SPE Reservoir Simulation Symposium, Feb. 14-17, 1999, pp. 451-462, Paper No. 51939, Society of Petroleum Engineers Inc., Houston, Texas.

Hadi Hajibeyge et al., Iterative Multiscale Finite-Volume Method, Journal of Computational Physics, Jun. 2008, vol. 227, Issue 19, pp. 8604-8621.

(56) References Cited

OTHER PUBLICATIONS

Ivan Lunati, Patrick Jenny, The Multiscale Finite Volume Method: A flexible tool to model physically complex flow in porous media, In: 10$^{th}$ European Conference on the Mathematics of Oil Recover—Amsterdam. The Netherland, Sep. 2006.

Vegard Kippe et al., A Comparison of Multiscale Methods for Elliptics Problems in Porous Media Flow, Computational Geosciences, Feb. 2008, vol. 12, No. 3, pp. 377-398, ISSN 1420-0597 (print) 1573-1499 (online).

PCT International Search Report dated Feb. 2, 2010 (3 pages).

* cited by examiner

US 8,594,986 B2

MULTI-SCALE FINITE VOLUME METHOD FOR RESERVOIR SIMULATION

RELATED APPLICATIONS

The present application for patent claims the benefit of provisional patent application U.S. Ser. No. 61/077,961, filed Jul. 3, 2008, which the entirety of the application is incorporated herein by reference.

FIELD OF THE INVENTION

The present invention generally relates to simulators for characterizing subsurface reservoirs, and more particularly, to simulators that use multi-scale methods to simulate fluid flow within subsurface reservoirs.

BACKGROUND OF THE INVENTION

Natural porous media, such as subsurface reservoirs containing hydrocarbons, are typically highly heterogeneous and complex geological formations. High-resolution geological models, which often are composed of millions of grid cells, are generated to capture the detail of these reservoirs. Current reservoir simulators are encumbered by the level of detail available in the fine-scale models and direct numerical simulation of subsurface fluid flow on the fine-scale is usually not practical. Various multi-scale methods, which account for the full resolution of the fine-scale geological models, have therefore been developed to allow for efficient fluid flow simulation.

Multi-scale methods include multi-scale finite element (MSFE) methods, mixed multi-scale finite element (MMSFE) methods, and multi-scale finite volume (MSFV) methods. All of these multi-scale methods can be applied to compute approximate solutions at reduced computational cost. While each of these methods reduce the complexity of a reservoir model by incorporating the fine-scale variation of coefficients into a coarse-scale operator, each take a fundamentally different approach to constructing the coarse-scale operator.

The multi-scale finite volume (MSFV) method is based on a finite volume methodology in which the reservoir domain is partitioned into discrete sub-volumes or cells and the fluxes over the boundaries or surfaces of each cell are computed. Since the fluxes leaving a particular cell are equivalent to the fluxes entering an adjacent cell, finite volume methods are considered to be conservative. Thus, the accumulations of mass in a cell are balanced by the differences of mass influx and outflux. Accordingly, mass conservation is strictly honored by multi-scale finite volume (MSFV) methods, which can be very important in some reservoir simulation applications such as when a mass conservative fine-scale velocity field is needed for multiphase flow and transport simulations.

The multi-scale finite element (MSFE) and mixed multi-scale finite element (MMSFE) methods are based on a finite element scheme, which breaks the reservoir domain into a set of mathematical spaces commonly referred to as elements. Physical phenomenon within the domain is then represented by local functions defined over each element. These methods are not mass conservative in a strict sense due to their underlying formulation, however, some finite element methods have been able to account for this shortcoming by coupling the pressure and velocity basis functions, such as in mixed multi-scale finite element (MMSFE) methods. However, such methods are computationally expensive and typically are not practical for use in commercial reservoir simulators.

SUMMARY OF THE INVENTION

According to an aspect of the present invention, a multi-scale method is disclosed for use in simulating a fine-scale geological model of a subsurface reservoir. The method includes providing a fine-scale geological model of a subsurface reservoir associated with a fine-scale grid having a plurality of fine-scale cells. The method includes defining a primary coarse-scale grid having a plurality of primary coarse-scale cells and a dual coarse-scale grid having a plurality of dual coarse-scale cells. The dual coarse-scale grid defines a portion of the fine-scale cells as internal, edge, and node cells. A coarse-scale operator is constructed based on the internal, edge, and node cells and pressure in the dual coarse-scale cells is computed using the coarse-scale operator. Pressure in the primary coarse-scale cells is computed using the pressure in the dual coarse-scale cells. A display is produced based on the pressure in the primary coarse-scale cells. For example, the display can include a representation of pressure distributions, velocity fields, and fluid flow within the subsurface reservoir.

The edge cells can be fine-scale cells having an interface, which is a transition between adjacent dual coarse-scale cells, traversing therethrough. The node cells can be fine-scale cells having portions of at least two interfaces traversing therethrough. The internal cells can be fine-scale cells free of an interface between adjacent dual coarse-scale cells.

An iterative scheme can be applied such that the computed pressures in the primary coarse-scale cells converge to a fine-scale pressure solution. Mass balance can also be maintained on the primary coarse-scale grid. In some embodiments, the iterative scheme modifies a coarse-scale source term and utilizes an inverse multi-scale matrix.

The pressure in the dual coarse-scale cells can be computed using a two-step process such that pressures are first computed within the node cells and then are prolongated onto the fine-scale grid. The coarse-scale operator can be constructed using a permutation matrix and a prolongation operator. The pressure in the primary coarse-scale cells can be computed using a permutation operator defined by the primary coarse-scale grid. A conservative velocity field can be computed based on the pressure in the primary coarse-scale cells.

Another aspect of the present invention includes a multi-scale method for use in simulating a fine-scale geological model of a subsurface reservoir. The method includes providing a fine-scale geological model of a subsurface reservoir associated with a fine-scale grid having a plurality of fine-scale cells. The method includes defining a primary coarse-scale grid having a plurality of primary coarse-scale cells. The method includes defining a dual coarse-scale grid having a plurality of dual coarse-scale cells such that adjacent dual coarse-scale cells form an interface that traverses some of the fine-scale cells. The fine-scale cells that are traversed by a single interface are defined as edge cells. The fine-scale cells that are traversed by portions of at least two interfaces are defined as node cells. The fine-scale cells that are free of an interface are defined as internal cells. Pressure is computed in the dual coarse-scale cells by computing pressures within the node cells and prolongating the pressures onto the fine-scale grid. Pressure in the primary coarse-scale cells is computed using the pressure in the dual coarse-scale cells. A display is produced based on the pressure in the primary coarse-scale cells. For example, the display can include a representation of pressure distributions, velocity fields, and fluid flow within the subsurface reservoir.

An iterative scheme can be applied such that the computed pressures in the primary coarse-scale cells converge to a fine-scale pressure solution. Mass balance can also be maintained on the primary coarse-scale grid. In some embodiments, the iterative scheme modifies a coarse-scale source term and utilizes an inverse multi-scale matrix.

Another aspect of the present invention includes a system for use in simulating a fine-scale geological model of a subsurface reservoir. The system includes a database, computer processor, a software program, and a visual display. The database is configured to store data such as fine-scale geological models, fine-scale grids, primary coarse-scale grids, dual coarse-scale grids, and coarse-scale operators. The computer processor is configured to receive data from the database and execute the software program. The software program includes a coarse-scale operator module and a computation module. The coarse-scale operator module constructs coarse-scale operators. The computation module computes pressure in the dual coarse-scale cells using a coarse-scale operator and computes pressure in the primary coarse-scale cells based on the pressure in the dual coarse-scale cells. In some embodiments, the computation model computes a conservative velocity field from the pressure in the primary coarse-scale cells. The visual display can display system outputs such as pressure distributions, velocity fields, and simulated fluid flow within the subsurface reservoir.

BRIEF DESCRIPTION OF THE DRAWINGS

FIG. 2A illustrates the fine-scale solution. FIG. 2B illustrates the multi-scale finite volume method with reduced problem-boundary conditions, in accordance with an aspect of the present invention.

DETAILED DESCRIPTION OF THE INVENTION

Embodiments of the present invention describe methods that utilize multi-scale physics and are applied to simulation of fluid flow within a subterranean reservoir. In particular, the multi-scale finite volume method, taught in U.S. Pat. Nos. 6,823,297 and 7,496,488, which are herein incorporated by reference, is reformulated into a more general framework that allows for comparison with other simulation approaches such as multigrid, domain decomposition, and other multi-scale methods. As will be described in greater detail herein, permutation operators are introduced that conveniently allow for reordering unknowns and equations. This formulation simplifies the implementation of the multi-scale finite volume method into a reservoir simulator. Furthermore, the formulation can easily be integrated in a standard fine-scale solver.

Embodiments of the present invention offer an optimal platform for investigating iterative approaches, which can improve the accuracy of simulation in critical cases such as reservoirs having impermeable shale layers, high anisotropy ratios, channelized media, or well-related non linearity. The presences of gravity and capillarity forces in the reservoir are accounted for and a simple iterative approach can be applied that ensures mass conservation at each iteration step.

A Natural Reordering Induced by a Dual Coarse Grid

A two-dimensional discrete boundary value problem of the form $$Au = r \quad \text{Equation (1)}$$

in the unknown $u = [u_1\ u_2\ \ldots\ u_j\ \ldots\ u_n]^T$, where $u_j = u(x_j)$ is defined at a discrete set of points $I_f = \{x_j\}_{j \in [1,N_f]}$, can be written in compact notation $u = [u(x_j \in I_f)]^T$; and with the source term $r = [r_j]^T$. The matrix $A = [a_{jk}]$ is symmetric and positive definite. In the following herein, the assumption is made that the points $\{x_j\}$ are defined as the cell centers of a Cartesian grid and that a 5-point stencil is used, such that the coefficient matrix A has pentadiagonal structure. The matrix is connected with a directed graph $G_A(I_f, \epsilon_f)$ consisting of a set of points, $I_f$, and a set of arrows, $\epsilon_f$; the graph $G_A$ is symmetric and boundary points are neglected for simplification.

Figure 1:
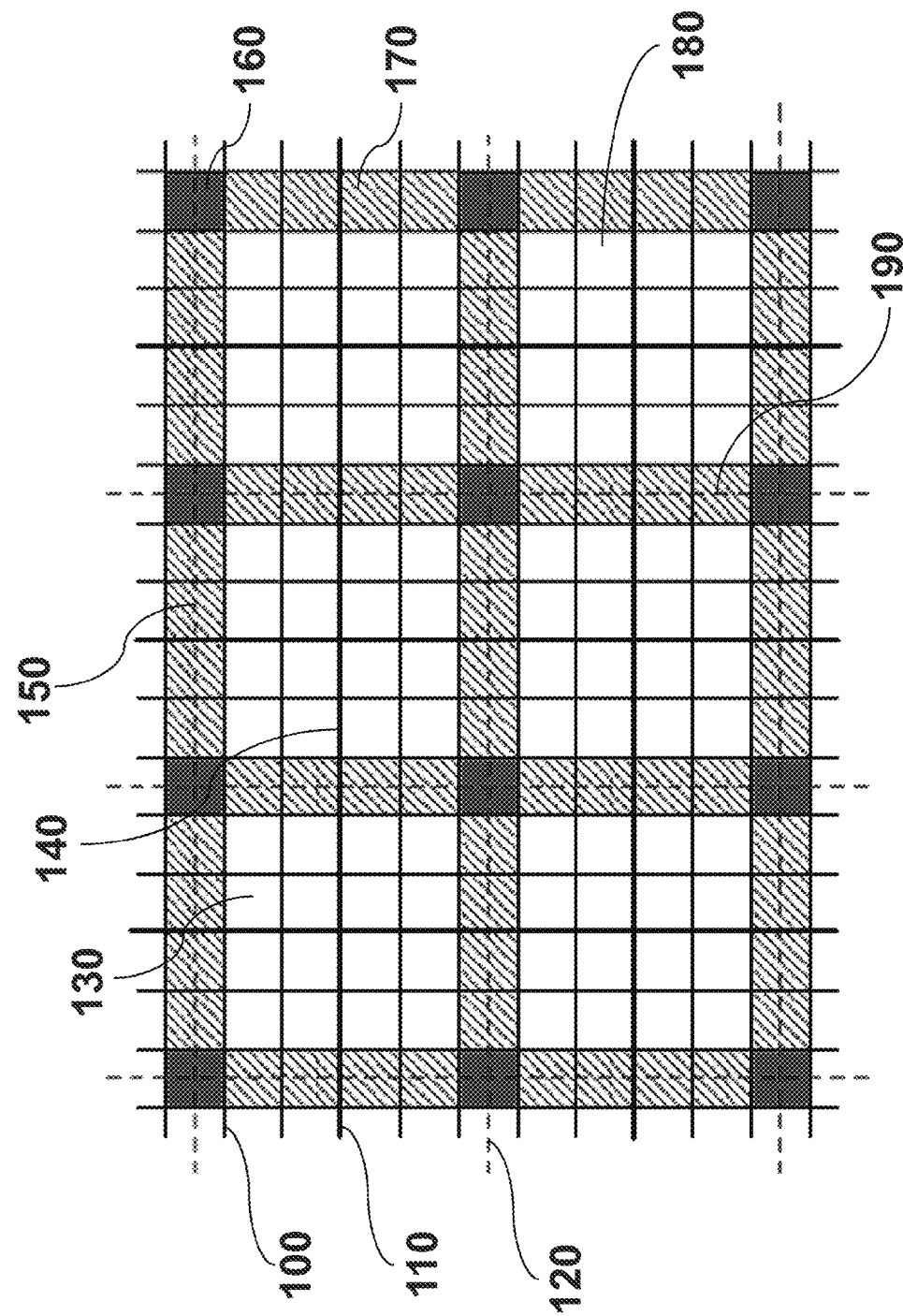
FIG. 1 is a schematic view of a two-dimensional fine-scale grid domain partitioned into internal, edge, and node point cells, in accordance with an aspect of the present invention.

FIG. 1 depicts the fundamental architecture of the multi-scale finite volume method with a fine-scale grid 100, a conforming primal coarse-scale grid 110 shown in bolded solid line, and a conforming dual coarse-scale grid 120 shown in dashed line. The fine-scale grid 100 includes of a plurality of fine-scale cells 130. The primal coarse-scale grid 110 has primal coarse-scale cells 140 and is constructed on the fine-scale grid 100 such that each primal coarse-scale cell 140 is comprised of multiple fine-scale cells 130. The dual coarse-scale grid 120, which also conforms to the fine-scale grid 100, is constructed such that each dual coarse-scale cell 150 is comprised of multiple fine-scale cells 130. For example in FIG. 1, both the primal coarse-scale cells 140 and dual coarse-scale cells 150 contain 5×5 fine-scale cells 130. One skilled in the art will appreciate that the primal coarse-scale and dual coarse-scale grids, respectively 110 and 120, can be much coarser than the underlying fine grid 100. It is also emphasized that the system and methods disclosed herein not limited to the simple grids shown in FIG. 1, as very irregular grids or decompositions can be employed, as well as, other sized grids such as the coarse-scale and dual coarse-scale cells containing 7×7 or 11×11 fine-scale cells.

If the dual coarse-scale grid 120 is constructed by connecting centrally located fine-scale cells contained within adjacent primal coarse cells 140, as shown in FIG. 1, the dual coarse-scale grid 120, $\tilde{\Omega} = \{\tilde{\Omega}^d\}_{d \in N_D}$, which consists of elements $\tilde{\Omega}^d$, naturally defines a partition of the points $\{x_j\}$ into node cells 160, edge cells 170, and internal cells 180. In particular, transitions between adjacent dual coarse-scale cells 150 form interfaces 190 that overly and traverse the fine-scale cells. Edge cells 170 are fine-scale cells having an interface traversing therethrough. Node cells 160 are fine-scale cells having portions of at least two interfaces 190 traversing therethrough. Internal cells 180 are fine-scale cells free of an interface 190 between adjacent dual coarse-scale cells. Therefore, $$I_f = I_n \cup I_e \cup I_i \quad \text{Equation (2)}$$

The sets $I_n$, $I_e$, and $I_i$ consist of $N_n$, $N_e$, and $N_i$ cells or points, respectively.

The fine-scale system given by Equation 1 can be reordered to obtain the following:

$$\tilde{A}\tilde{u} = \begin{bmatrix} \tilde{A}_{ii} & \tilde{A}_{ie} & \tilde{A}_{in} \\ \tilde{A}_{ei} & \tilde{A}_{ee} & \tilde{A}_{en} \\ \tilde{A}_{ni} & \tilde{A}_{ne} & \tilde{A}_{nn} \end{bmatrix} \begin{bmatrix} \tilde{u}_i \\ \tilde{u}_e \\ \tilde{u}_n \end{bmatrix} = \begin{bmatrix} \tilde{r}_i \\ \tilde{r}_e \\ \tilde{r}_n \end{bmatrix} = \tilde{r} \quad \text{Equation (3)}$$

where $\tilde{u}_i = [u(x_j \epsilon I_i)]^T$, $\tilde{u}_e = [u(x_j \epsilon I_e)]^T$, and $\tilde{u}_n = [u(x_j \epsilon I_n)]^T$ (Analogous definitions apply to $\tilde{r}$). The coefficient matrix is expressed as $\tilde{A} = [\tilde{A}_{jk}]$, where the block $\tilde{A}_{jk}$ represents the effects of the unknowns $\tilde{u}_{k \in \{i,e,n\}}$ on the mass balance of the points $x \in I_{j \in \{i,e,n\}}$. Note that the reordered matrix is preferably connected to exactly the same symmetric directed graph, $G_A$, as the original matrix; and the two problems are identical.

The blocks of the matrix have the following properties:
$\tilde{A}_{jk} = (\tilde{A}_{kj})^T$;
in particular, $\tilde{A}_{in} = (\tilde{A}_{ni})^T = [0]_{N_i \times N_n}$ is given considering a 5-point stencil on the fine grid;
the blocks $\tilde{A}_{ie}$ and $\tilde{A}_{en}$ are rectangular matrices of sizes $N_i \times N_e$ and $N_e \times N_n$, respectively;
the diagonal blocks $\tilde{A}_{ii}$, $\tilde{A}_{ee}$, and $\tilde{A}_{nn}$ are square matrices of sizes $N_i \times N_i$, $N_e \times N_e$, and $N_n \times N_n$, respectively;
$\tilde{A}_{nn}$ is diagonal;
if properly ordered, $\tilde{A}_{ii}$ is block-diagonal and consists of $N_D$ pentadiagonal blocks;
$\tilde{A}_{ee}$ is block-diagonal and consists of $N_E$ tridiagonal blocks, where $N_E$ is the number of edges of the coarse grid and $N_E \neq N_e$, as $N_e$ represents the number of edge cells or points;

It is useful at this point to introduce the $N_f \times N_f$ permutation matrix $\tilde{P}$. The permutation matrix is associated with the reordering, such that $$\tilde{u} = \tilde{P}u \quad \text{Equation (4)}$$

The permutation matrix has exactly a single entry of one appearing in each row and each column. For example, if $\tilde{P}_{jk} = 1$ the element $u_k$ will become the element $\tilde{u}_j$ of the new vector. By recalling that permutation matrices are orthogonal, such that $\tilde{P}^T \tilde{P} = \tilde{P}^{-1} \tilde{P} = 1$, it can be written $\tilde{P} A \tilde{P}^T \tilde{P} u = \tilde{P} r$. Therefore, Equation 3 can be written in the form of $$\tilde{A} = \tilde{P} A \tilde{P}^T \quad \text{Equation (5)}$$

Formulation of the MSFV Method

The Reordered Multi-Scale Matrix

By reordering unknowns and equations, Equation 3 remains identical to the original linear system. However, in a multi-scale method a different system is solved, which can be represented in the form of $$M\tilde{u} = \begin{bmatrix} M_{ii} & M_{ie} & M_{in} \\ M_{ei} & M_{ee} & M_{en} \\ M_{ni} & M_{ne} & M_{nn} \end{bmatrix} \begin{bmatrix} \tilde{u}_i \\ \tilde{u}_e \\ \tilde{u}_n \end{bmatrix} = \begin{bmatrix} q_i \\ q_e \\ q_n \end{bmatrix} = q \quad \text{Equation (6)}$$

In the standard Multi-Scale Finite Volume (MSFV) representation, the matrix M takes the form $$\begin{bmatrix} \tilde{A}_{ii} & \tilde{A}_{ie} & 0 \\ 0 & M_{ee} & \tilde{A}_{en} \\ 0 & 0 & M_{nn} \end{bmatrix} \begin{bmatrix} \tilde{u}_i \\ \tilde{u}_e \\ \tilde{u}_n \end{bmatrix} = \begin{bmatrix} q_i \\ q_e \\ q_n \end{bmatrix} \quad \text{Equation (7)}$$

In Equation 7, block $\tilde{A}_{ie}$, resp. $\tilde{A}_{ei}$, contains the active connections (internal points-edge points) that determine the pressure at the internal points or cells with respect to edge points or cells. Solving a reduced problem along the edges implies that the connections "internal point-edge point" are removed when the edge point equations are solved, hence, $M_{ei} = 0$. However, when solving for the internal points, connections with the edges are active, such that $M_{ie} = \tilde{A}_{ie} \neq 0$.

Figure 2B:
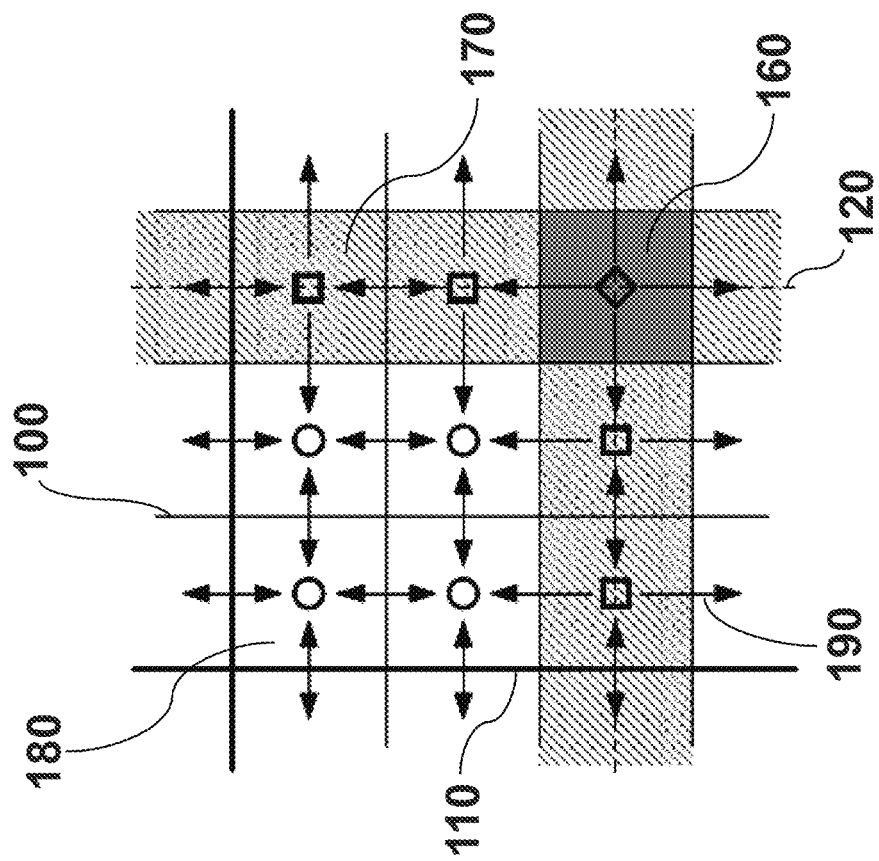
FIGS. 2A and 2B are schematic views of two-dimensional fine-scale grid domain stencils illustrating mass balance between adjacent fine-scale cells.
Figure 2A:
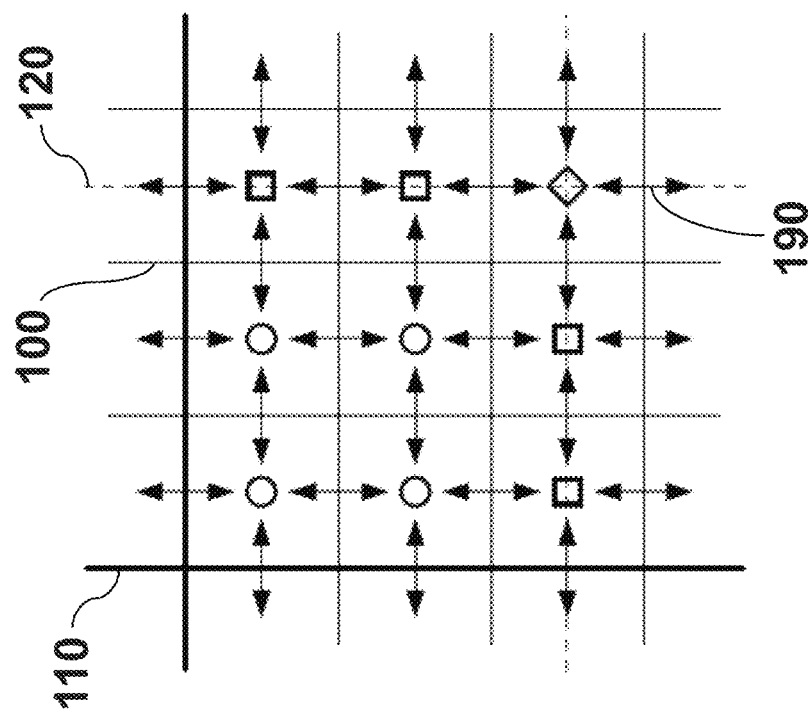

FIGS. 2A and 2B are representations of stencils for the fine-scale solution and the multi-scale method with reduced problem-boundary conditions, respectively, that illustrate the connections between the adjacent cells. Nodal cells 160 are shaded grey and are represented by diamonds, edge cells 170 are cross-hatched and are represented by squares, and internal cells 180 maintain a white background and are represented by circles within the fine-scales cells. Arrows 190 indicate the pressure value affecting mass balance between adjacent cells. Rigorously, removing some connections requires modifying the diagonal entries of $\tilde{A}_{ee}$ to guarantee mass balance. However, for some iteration schemes there can be in general no reason to enforce exact one dimensional mass balance along the edges if iteration is to be implemented, as it may be useful to have $M_{ee} = \tilde{A}_{ee}$. If $M_{ee}$ represents a uniform stencil, Equation 7 describes the multi-scale method with linear boundary conditions.

In Equation 7 the diagonal block $\tilde{A}_{nn}$ has been replaced by a multi-diagonal block $M_{nn}$, which is a 7-diagonal matrix in the standard multi-scale finite volume implementation. As will be described in greater detail later herein, $M_{nn}$ is the coarse-scale operator, which is constructed based on an appropriate "prolongation" operator. These operators are defined consistently in order to guarantee mass conservation. Analogously, $\tilde{r}$ has been replaced by q. Note that $q_i = \tilde{r}_i$ and $q_n = \tilde{r}_n$, whereas in general $q_e \neq \tilde{r}_e$, (for instance, for the gravity term).

Since $\tilde{A}$ and M have different graphs, the multi-scale finite volume solution will never coincide with the fine-scale solution. A multi-scale method can be viewed as consisting of two steps: a localization step and a global-coupling step. In the language of graph theory, the localization is achieved by breaking the symmetry of the directed graph: the matrix is reduced to a block upper-triangular matrix, $\tilde{A}_U + \tilde{A}_D$ by setting $\tilde{A}_{ei} = \tilde{A}_{ne} = 0$. The directed graph $G_{\tilde{A}_U + \tilde{A}_D} \subset G_A$ is characterized by the fact that node points, do not have predecessors ($\tilde{A}_{nn}$ is diagonal); edge points do not have predecessors in $\Omega_i$. The global coupling can be seen as the introduction of a new symmetric direct graph $G_{M_{nn}}(I_n, \epsilon_n)$ Hence, $G_M = G_{\tilde{A}_U + \tilde{A}_D} + G_{M_{nn}} \neq G_A$.

Coarse Scale Operator and Prolongation Operator

The multi-scale finite volume method employs an additional coarse-scale grid to define the coarse-scale (global-coupling) problem. This coarse-scale grid or mesh, $\overline{\Omega} = \{\overline{\Omega}_n\}_{n \in [1, N_n]}$, defines the coarse-scale control volumes and is a partition of the domain. It is useful to introduce two operators at this point: a permutation operator, $\overline{P}$, which will be defined later, and the operator X, which is represented by a $N_n \times N_f$ matrix. Each row of $X = [X_{j \in [1, N_n]}] = [X_{jk}]$ corresponds to an element $\overline{\Omega}_n$, which yields the definition $$\chi_{jk} = \begin{cases} 1 & \text{if } x_k \in \overline{\Omega}_j \\ 0 & \text{otherwise} \end{cases} \quad \text{Equation (8)}$$

When applied to a vector of size $N_f$, this operator performs a restriction and returns a vector of size $N_n$, whose entries are the sum of the values assumed by the original vector in the corresponding coarse-scale elements. If the set of independent vectors $\{e^j\}_{j\in[1,N_f]}$ is considered such that $e^j=[e_k^j=\delta_{jk}]^T$ (hence, they are a base of the vector space), the rows of the operator $\chi$ can be written as $$\chi_j = \left(\sum_{k\in\{k|x_k\in\bar{\Omega}_j\}} e^k\right)^T \qquad \text{Equation (9)}$$

Prolongation and the coarse-scale operators can now be constructed. M is block upper triangular, such that Eq. 7 can be solved by a backward-substitution method, which yields $$\tilde{u}_n=(M_{nn})^{-1}q_n \qquad \text{Equation (10)}$$

$$\tilde{u}_e=(M_{ee})^{-1}(q_e-\tilde{A}_{en}\tilde{u}_n) \qquad \text{Equation (11)}$$

$$\tilde{u}_i=(M_{ii})^{-1}(q_i-\tilde{A}_{ie}\tilde{u}_e) \qquad \text{Equation (12)}$$

which can be expressed in matrix form as $$\begin{bmatrix}\tilde{u}_i\\\tilde{u}_e\\\tilde{u}_n\end{bmatrix} = \begin{bmatrix}(\tilde{A}_{ii})^{-1}\tilde{A}_{ie}(M_{ee})^{-1}\tilde{A}_{en}\\-(M_{ee})^{-1}\tilde{A}_{en}\\I_{nn}\end{bmatrix}(M_{nn})^{-1}q_n + \qquad \text{Equation (13)}$$

-continued $$\begin{bmatrix}(\tilde{A}_{ii})^{-1}q_i - (\tilde{A}_{ii})^{-1}\tilde{A}_{ie}(M_{ee})^{-1}q_e\\(M_{ee})^{-1}q_e\\0\end{bmatrix}$$

where $I_{nn}$ is the $N_n \times N_n$ identity matrix, and $M_{ii}=\tilde{A}_{ii}$ has been used. This problem can be split in two steps: first, a coarse scale problem is solved to compute the coarse-scale pressures represented by the node cell, which can be performed using $$M_{nn}\tilde{u}_n=q_n \qquad \text{Equation (14)}$$

The solution is then prolongated on the fine grid using $$\tilde{u}=B\tilde{u}_n+Cq \qquad \text{Equation (15)}$$

where the $N_f \times N_n$ prolongation operator is defined as $$B = \begin{bmatrix}(\tilde{A}_{ii})^{-1}\tilde{A}_{ie}(M_{ee})^{-1}\tilde{A}_{en}\\-(M_{ee})^{-1}\tilde{A}_{en}\\I_{nn}\end{bmatrix} \qquad \text{Equation (16)}$$

and the $N_f \times N_f$ matrix is defined as $$C = \begin{bmatrix}(\tilde{A}_{ii})^{-1} & -(\tilde{A}_{ii})^{-1}\tilde{A}_{ie}(M_{ee})^{-1} & 0\\0 & (M_{ee})^{-1} & 0\\0 & 0 & 0\end{bmatrix} \qquad \text{Equation (17)}$$

The term $q_n$ does not contribute to $Cq$ because the last column of $C$ consists of zeros only. However, while $q_n$ does not appear in Equation 15 directly, it does appear indirectly through Equation 14.

The inverse multi-scale matrix, $(M)^{-1}$, can be readily derived by defining the restriction operator, R, for the unknown $\tilde{u}$, such that $$\tilde{u}_n = R\tilde{u} = [0\ 0\ I_{nn}]\begin{bmatrix}\tilde{u}_i\\\tilde{u}_e\\\tilde{u}_n\end{bmatrix} \qquad \text{Equation (18)}$$

This corresponds to the assumption that the coarse pressures are the fine-scale pressures at the nodes. Then, $\tilde{u}=(M_{nn})^{-1}Rq$ can be written in Equation 15 and the inverse multi-scale matrix can be expressed as $$(M)^{-1}=B(M_{nn})^{-1}R+C \qquad \text{Equation (19)}$$

or explicitly as $$(M)^{-1} = \begin{bmatrix}(\tilde{A}_{ii})^{-1} & -(\tilde{A}_{ii})^{-1}\tilde{A}_{ie}(M_{ee})^{-1} & (\tilde{A}_{ii})^{-1}\tilde{A}_{ie}(M_{ee})^{-1}A_{en}(M_{nn})^{-1}\\0 & (M_{ee})^{-1} & -(M_{ee})^{-1}A_{en}(M_{nn})^{-1}\\0 & 0 & (M_{nn})^{-1}\end{bmatrix} \qquad \text{Equation (20)}$$

A coarse-scale problem that satisfies the coarse-scale mass balance can be obtained by substituting Equation 15 into Equation 3 and applying the operator $\chi$, which yields $$\chi\tilde{A}\tilde{u}=\chi\tilde{A}B\tilde{u}_n+\chi\tilde{A}Cq=\chi\tilde{r} \qquad \text{Equation (21)}$$

from which the coarse scale operator can be deduced as $$(M_{nn})=\chi\tilde{A}B \qquad \text{Equation (22)}$$

and the coarse-scale right hand side as $$q_n=\chi\tilde{r}-\chi\tilde{A}Cq \qquad \text{Equation (23)}$$

The effect of the second term on the right hand side of the coarse scale equation is equivalent to the coarse-scale effect of the correction function.

The Relationship Between the Prolongation Operator and the Basis Functions

The operator $\chi$, which has been defined in the previous section, can be seen as a restriction operator, which reduces the fine scale problem to a coarse problem. This operator is the discrete analogous of the control-volume integral operator used to derive the finite volume discretization. Recall that the restriction operator, R, for the unknown $\tilde{u}$ is much simpler.

By defining a subset $\{e^n\}=\{e^n=Re^j\}=\{e^j|x_j\in I_n\} \subset \{e^j\}$, and recalling the definition of the basis function relative to the node j, given by $\bar{\phi}_j$, it can be written $$\tilde{\varphi}_n = Be^n = B\begin{bmatrix} 0 \\ \ldots \\ e_n^n = 1 \\ \ldots \\ 0 \end{bmatrix} = \sum_{k \in I_n} B_{jk} e_k^n = \sum_{k \in I_n} B_{jk} \delta_{kn} = B_{jn} \quad \text{Equation (24)}$$

where n is a specific index. From Equation 24 it appears that the columns of B are the basis functions of the multi-scale finite volume method. For comparison with the standard multi-scale finite volume implementation, note that all four basis functions that are adjacent to the node $x_j^n$ have been simultaneously defined.

An accurate description of the source term, $\tilde{r}$, requires the definition of the correction function $$\tilde{\varphi}_* = B\begin{bmatrix} 0 \\ \ldots \\ 0 \end{bmatrix} + Cq = Cq \quad \text{Equation (25)}$$

which is described in patent application U.S. Ser. No. 11/763,109, which is herein incorporated by reference. The original implementation of the multi-scale finite volume method without correction function assumes $q^i = 0$ and $q^e = 0$ to describe the affects of the right-hand side, whereas $q'' = \chi\tilde{r}$, which yields $Cq = 0$. This strong approximation prevents the multi-scale finite volume method without correction function from properly accounting for the presence of non-multi-linear effects given by the right hand side.

The Conservative Velocity Field

In the multi-scale finite volume method a conservative velocity field is constructed by solving a set of local pressure problems on the volumes defined by the primary partition, that is in each coarse cell, $\overline{\Omega}_i$. From this problem a new pressure, v, is obtained, which is used to compute a conservative velocity field. In order to reformulate this step of the algorithm, it is useful to define the permutation operator $\overline{P}$ induced by the primary partition. This permutation operator reorders unknowns and equations of the linear system, given by Equation 1, such that the resulting matrix, $\overline{A} = \overline{P}A\overline{P}^T$, has a pentadiagonal block structure. Each diagonal block correspond to a coarse cell $\overline{\Omega}_i$. The off diagonal blocks represent the mutual effect between adjacent blocks. Accordingly, they contain the transmissibilities between nodes belonging to two distinct, but adjacent blocks. By defining $D = \text{diag}(\overline{A})$, which is the block diagonal part of the reordered matrix, the fine-scale problem can be rewritten in the form $$D\overline{v} + (\overline{A} - D)\overline{v} = \overline{r} \quad \text{Equation (26)}$$

where $\overline{v} = \overline{P}v$ and $\overline{r} = \overline{P}r$ have been defined. In the standard multi-scale finite volume algorithm the second term on the left hand side is approximate as $(\overline{A}-D)\overline{v} \approx (\overline{A}-D)\overline{P}\tilde{P}^T\tilde{u}$, where $\tilde{u}$ is the solution of $M\tilde{u} = \tilde{q}$, defined previously herein. Therefore, this yields $$D\overline{v} = \overline{r} - (\overline{A}-D)\overline{P}\tilde{P}^T\tilde{u} \quad \text{Equation (27)}$$

Only fluxes across the boundaries of the primary grid contribute to the second term on the right hand side.

Figure 3:
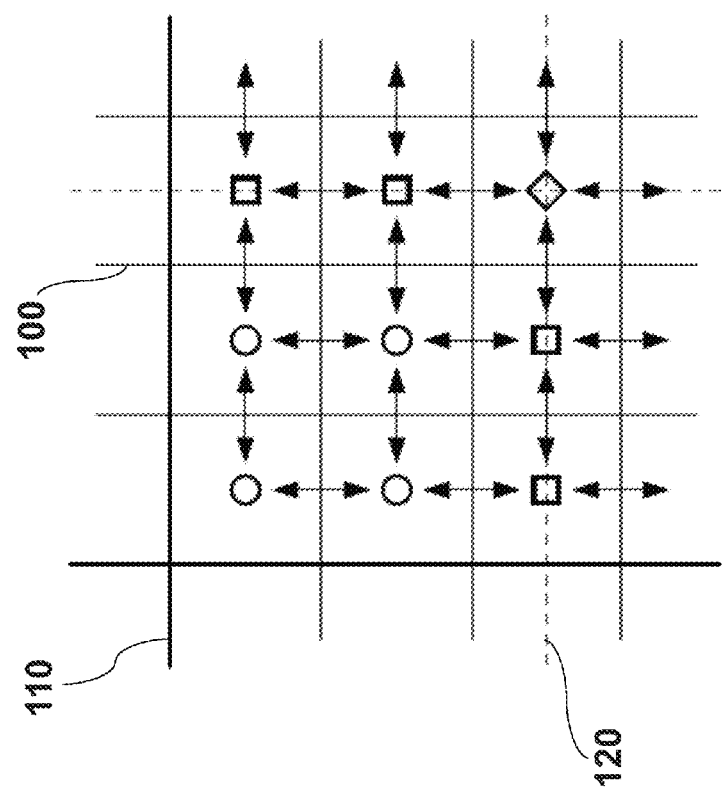
FIG. 3 is a schematic view of a two-dimensional fine-scale grid domain stencil used to construct a conservative velocity field, in accordance with an aspect of the present invention.

FIG. 3 is an illustration of the stencils used for the construction of the conservative velocity field. An arrow from one cell to the adjacent cell indicates that the pressure value of the one cell affects the mass balance of the adjacent cell.

Some Considerations on the Implementation

Once the operators $\tilde{P}$, $\chi$, and $\overline{P}$ are constructed, the abstract formulation introduced allows implementing the multi-scale finite volume method at a very high programming level if a matrix algebra is defined. After the blocks of the matrix $\tilde{A} = \tilde{P}A\tilde{P}^T$ have been identified, B and C can be easily obtained and the coarse-scale operator is readily defined as $M = \chi\tilde{P}A\tilde{P}^T B$. Preferably, this can be applied "as it is" to any linear system $Au = r$, regardless to the described physical processes. As will be appreciated by those skilled in the art, the accuracy of the method will depend on the quality of the localization assumption.

Figure 4:
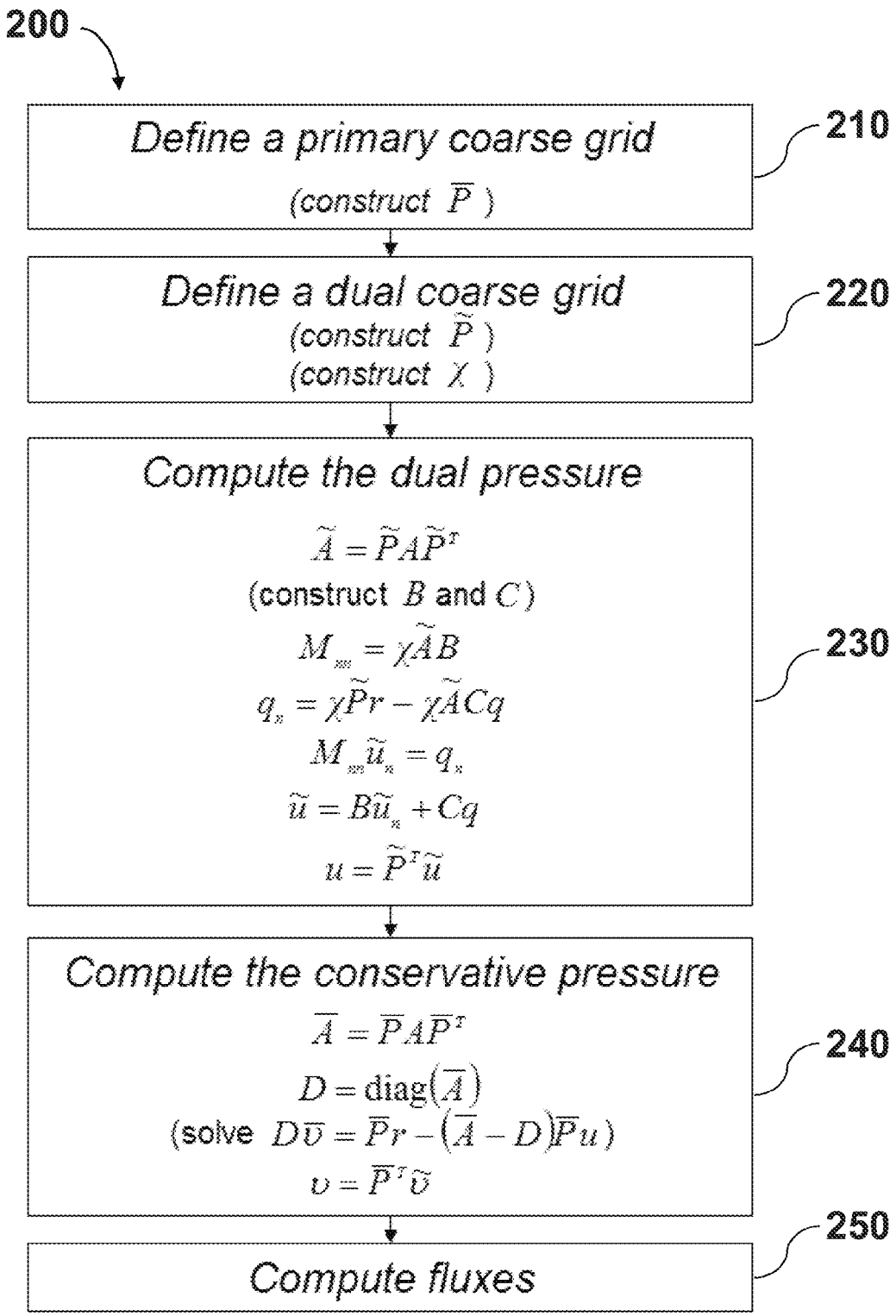
FIG. 4 is a flowchart illustrating steps used in a finite volume multi-scale method, in accordance with an aspect of the present invention.

FIG. 4 illustrates the following steps of a multi-scale finite volume method 200 that can be used for simulation of fluid flow in a subsurface reservoir. Given $Au = r$, Step 210 includes defining a primary coarse-scale grid. As previously described, primary coarse-scale grid has a plurality of primary coarse-scale cells and is coarser than the fine-scale grid of the geological model of the subsurface reservoir. Permutation operator $\overline{P}$, which is induced by the primary coarse grid, can be constructed once the primary coarse-scale grid has been defined. Step 220 includes defining a dual coarse grid. Dual coarse-scale grid has a plurality of dual coarse-scale cells and is also coarser than the fine-scale grid. Dual coarse-scale grid is typically offset from the primary coarse-scale grid. Permutation matrix $\tilde{P}$ and prolongation operator $\chi$, which are associated with dual coarse-scale grid, can be constructed once the dual coarse-scale grid has been defined. The dual coarse-scale pressure, u, which is the pressure in the dual coarse-scale cells, is computed in step 230. Knowing $\tilde{A} = \tilde{P}A\tilde{P}^T$, B and C may be constructed using equations 16 and 17 to derive the coarse scale operator $M_{nn} = \chi\tilde{A}B$ and $q_n = \chi\tilde{P}r - \chi\tilde{A}Cq$. $M_{nn}\tilde{u}_n = q_n$ may then be solved and the dual coarse-scale pressure u may be obtained using $\tilde{u} = B\tilde{u}_n + Cq$ and $u = \tilde{P}^T\tilde{u}$. The conservative pressure v, which is the pressure in the primary coarse-scale cells, is calculated in step 240. Using $\overline{A} = \overline{P}A\overline{P}^T$ and $D = \text{diag}(\overline{A})$, the equation $D\overline{v} = \overline{P}r - (\overline{A}-D)\overline{P}u$ can be solved. The conservative pressure v can then be computed using the relation $v = \overline{P}^T\overline{v}$. Once the conservative pressure v is obtained the fluxes may be computed, as shown in step 250. This step can include constructing conservative velocity fields, as previously described, as well as solving transport problems to construct saturation fields.

This optimization, both in terms of memory and speed, calls for an appropriate data structure that enables one to efficiently store large sparse matrices (making abundant use of pointers to reorder matrix and vectors), to take advantage of the block (diagonal) structure of the matrices when applying linear solvers, and to easily implement adaptivity.

Introduction of Iterative Methods

The original fine-scale problem has been split in a set of localized problems by forcing the matrix M to be upper-triangular. This approximation is good if the element of $\tilde{A}^{ei}$ are small, which is not always guaranteed. For example, for anisotropic problems $\tilde{A}^{ei}$ becomes dominant if the permeability is larger in the direction transversal to the edge. Therefore, iterative procedures can be utilized to improve the accuracy of the multi-scale finite volume solution and achieve fine-scale convergence.

A Simple Iterative Method

As a simple example, consider the linear iterative scheme of the form $$\tilde{u}^\nu = \tilde{u}^{\nu-1} + \omega(M)^{-1}(\tilde{r} - \tilde{A}\tilde{u}^{\nu-1}) \quad \text{Equation (28)}$$

which can be reformulated in terms of increments, $\delta^\nu := \tilde{u}^\nu - \tilde{u}^{\nu-1}$ and residuals, $\epsilon^\nu := \tilde{r} - \tilde{A}u^\nu$, which can be given as $$\delta^\nu = \omega(M)^{-1}\epsilon^{\nu-1} \quad \text{Equation (29)}$$

This linear iteration is convergent for $\omega \in (0, 2/\rho(M^{-1}\tilde{A}))$, where $\rho$ is the spectral radius, and has optimal convergence rate when $\omega = 2(\lambda_{min}(M^{-1}\tilde{A}) + \lambda_{max}(M^{-1}\tilde{A}))^{-1}$, where $\lambda_{min}(M^{-1}\tilde{A})$ is the minimum eigenvalue and $\lambda_{max}(M^{-1}\tilde{A})$ is the maximum eigenvalue. In this iterative procedure, the inverse multi-scale finite volume matrix is regarded as a pre-conditioner, whereas Equation 28 is called smoother. However, this simple procedure has the drawback of not preserving the advantages of M, which is mainly the coarse-scale mass conservation.

Preferably, iterative procedures should satisfy the following properties:

Property 1—Fine-scale convergence: $\tilde{r} - \tilde{A}\tilde{u}^\nu \to 0$ if $\nu \to \infty$;
Property 2—Coarse-scale mass balance on the primal grid: $\chi(\tilde{r} - \tilde{A}\tilde{u}^\nu) = 0$, $\forall \nu$.

By applying an iterative scheme, the following can be derived $$\epsilon^\nu = (\tilde{r} - \tilde{A}\tilde{u}^\nu) = (I - \omega \tilde{A}(M)^{-1})^\nu (\tilde{r} - \tilde{A}\tilde{u}^0) \quad \text{Equation (30)}$$

where $\tilde{u}^0$ is the solution of the multi-scale finite volume problem, $\tilde{u}^0 = (M)^{-1} q$. Although $\tilde{u}^0$ satisfies coarse-scale mass balance, in general $\chi \epsilon^\nu \neq 0$ for $\nu \neq 0$ and $\nu \neq \infty$ are given.

An Iterative Scheme Conserving Mass

To obtain an iterative scheme that satisfies coarse-scale mass balance, the coarse-scale problem can be appropriately modified. Specifically, the coarse-problem source term, which can be readily derived by replacing q by $q^{\nu-1} = q + \epsilon^{\nu-1}$, can be modified. Therefore at iteration $\nu$, the prolongated solution yields $$\tilde{u}^\nu = B\tilde{u}_n^\nu + Cq^{\nu-1} \quad \text{Equation (31)}$$

where $\tilde{u}_n^\nu$ is solution of the coarse-scale problem $$M_{nn}\tilde{u}_n^\nu = q_n^{\nu-1} \quad \text{Equation (32)}$$

Again a solution satisfying coarse-scale mass balance is obtained by substituting the prolongation solution, given by Equation 31, into the fine scale problem, given by Equation 3, and applying the operator $\chi$. This yields $$\chi\tilde{A}\tilde{u}^\nu = \chi\tilde{A}B\tilde{u}_n^\nu + \chi\tilde{A}Cq^{\nu-1} = \chi\tilde{r} \quad \text{Equation (33)}$$

or $$q_n^{\nu-1} = \chi\tilde{r} - \chi\tilde{A}Cq^{\nu-1} = q_n\chi\tilde{A}C\epsilon^{\nu-1} \quad \text{Equation (34)}$$

Therefore, the unknown $\tilde{u}^\nu$ is solution of the problem $$M\tilde{u}^\nu = q^{\nu-1} = q + E\epsilon^{\nu-1} \quad \text{Equation (35)}$$

where the matrix M is given by Equation 7 with $M_{nn} = \chi\tilde{A}B$ and the following is defined $$E = \begin{bmatrix} I_{ii} & 0 & 0 \\ 0 & I_{ee} & 0 \\ 0 & 0 & 0 \end{bmatrix} - \quad \text{Equation (36)}$$

$$\begin{bmatrix} 0 & 0 & 0 \\ 0 & 0 & 0 \\ \chi_{ni} & \chi_{ne} & \chi_{nn} \end{bmatrix} \tilde{A}C = \begin{bmatrix} [I_{ii} & 0 & 0] \\ [0 & I_{ee} & 0] \\ -\chi\tilde{A}C \end{bmatrix}$$

The solution of Equation 35 satisfies the Property 2 by construction. This can also be verified by considering $$\chi(\tilde{r} - \tilde{A}\tilde{u}^{\nu-1}) = \chi(\tilde{r} - \tilde{A}(M)^{-1}q^{\nu-1}) = \quad \text{Equation (37)}$$

$$\chi(\tilde{r} - \tilde{A}(B(M_{nn})^{-1}R - C)q^{\nu-1})$$

-continued $$= \chi\tilde{r} - \chi\tilde{A}Cq^{\nu-1} - M_{nn}(M_{nn})^{-1}Rq^{\nu-1} = \quad \text{Equation (38)}$$

$$q_n^{\nu-1} - q_n^{\nu-1} = 0$$

However, it does not converge to the fine-scale solution and Property 1 is not satisfied. Indeed, by adding and subtracting $M\tilde{u}^{\nu-1}$ on the right hand side of Equation 35 and rearranging one can write $$\delta^\nu = -(M)^{-1}E\tilde{A}\delta^{\nu-1} \quad \text{Equation (39)}$$

which shows that $\delta^\nu \to 0$ does not imply $\epsilon^\nu \to 0$. Moreover, from Equation 35, it is observed that zero residual implies $\tilde{u}^\nu = \tilde{u}^0 = (M)^{-1}q$.

A Converging, Mass-Conserving Scheme

Considering the following iterative scheme $$\tilde{u}^\nu = \tilde{u}^{\nu-1} + \omega(M)^{-1}E(\tilde{r} - \tilde{A}\tilde{u}^{\nu-1}) \quad \text{Equation (40)}$$

which can be reformulated in terms of increments and residuals as $$\delta^\nu = \omega(M)^{-1}E\epsilon^{\nu-1} \quad \text{Equation (41)}$$

It is easy to show that this scheme satisfies Property 2:

$$\chi(\tilde{r} - \tilde{A}\tilde{u}^\nu) = \chi(I - \omega\tilde{A}(M)^{-1}E)(\tilde{r} - \tilde{A}\tilde{u}^{\nu-1}) \quad \text{Equation (42)}$$

$$= (\chi - \omega(\chi\tilde{A}B(M_{nn})^{-1}R - \chi\tilde{A}C)E) \quad \text{Equation (43)}$$

$$(\tilde{r} - \tilde{A}\tilde{u}^{\nu-1})$$

$$= (\chi - \omega RE - \omega\chi\tilde{A}C)(\tilde{r} - \tilde{A}\tilde{u}^{\nu-1}) \quad \text{Equation (44)}$$

$$= (\chi - \omega(-\chi\tilde{A}C) - \omega\chi\tilde{A}C)(\tilde{r} - \tilde{A}\tilde{u}^{\nu-1}) \quad \text{Equation (45)}$$

$$= \chi(\tilde{r} - \tilde{A}\tilde{u}^{\nu-1}) = \chi(\tilde{r} - \tilde{A}\tilde{u}^0) = 0 \quad \text{Equation (46)}$$

where $CE = C$ and $RE = -\chi\tilde{A}C$ have been used.

Moreover, the iterative scheme converges, if and only if, $\tilde{u}^\nu$ is solution of the original problem. If $\tilde{u}^\nu = \tilde{u}^{\nu-1}$, it follows immediately that $E(\tilde{r} - \tilde{A}\tilde{u}^\nu) = 0$, hence, by recalling the definition of E, given in Equation 36, it yields $$\tilde{r}_i - \tilde{A}_{ii}\tilde{u}_i^\nu - \tilde{A}_{ie}\tilde{u}_e^\nu = 0 \quad \text{Equation (47)}$$

$$\tilde{r}_e - \tilde{A}_{ei}\tilde{u}_i^\nu - \tilde{A}_{ee}\tilde{u}_e^\nu - \tilde{A}_{en}\tilde{u}_n^\nu = 0 \quad \text{Equation (48)}$$

$$-\chi\tilde{A}C(\tilde{r} - \tilde{A}\tilde{u}^\nu) = 0 \quad \text{Equation (49)}$$

Since the iterative scheme satisfies Property 2, such that $\chi(\tilde{r} - \tilde{A}\tilde{u}^\nu) = 0$, it can be written $$0 = [\chi_{ni} \; \chi_{ne} \; \chi_{nn}] \begin{bmatrix} \tilde{r}_i - \tilde{A}_{ii}\tilde{u}_i^\nu - \tilde{A}_{ie}\tilde{u}_e^\nu \\ \tilde{r}_e - \tilde{A}_{ei}\tilde{u}_i^\nu - \tilde{A}_{ee}\tilde{u}_e^\nu - \tilde{A}_{en}\tilde{u}_n^\nu \\ \tilde{r}_n - \tilde{A}_{ne}\tilde{u}_e^\nu - \tilde{A}_{nn}\tilde{u}_n^\nu \end{bmatrix} = \quad \text{Equation (50)}$$

$$\tilde{r}_n - \tilde{A}_{ne}\tilde{u}_e^\nu - \tilde{A}_{nn}\tilde{u}_n^\nu$$

where Equations 47 and 48 have been used, along with $\chi_{nn} = I_{nn}$ (note that $\tilde{A}_{in} = 0$ and $\tilde{A}_{ni} = 0$). Equations 47-49 and 50 imply that $(\tilde{r} - \tilde{A}\tilde{u}^\nu) = 0$, hence, $\tilde{u}^\nu$ is solution of the fine-scale problem. On the other hand, if $\tilde{A}\tilde{u}^\nu = \tilde{r}$ it is trivial to show that $\tilde{u}^\nu = \tilde{u}^{\nu-1}$. Therefore, Property 1 is satisfied. Moreover, by analogy with Equation 28, this linear iteration is convergent for $\omega \in (0, 2/\rho(M^{-1}E\tilde{A}))$ and has optimal convergence rate when $\omega = 2(\lambda_{min}(M^{-1}E\tilde{A}) + \lambda_{max}(M^{-1}E\tilde{A}))^{-1}$.

Therefore, starting from an operator-based formulation of the multi-scale finite volume method, a mass conservative iterative scheme has been derived that can improve the accuracy of the method, eventually, converging to the fine-scale solution. Matrix reordering allows for a very compact formulation of the multi-scale finite volume method, which can be programmed at a very high level, once the reordering operators are defined. An efficient and optimized method preferably relies on an appropriate data structure that enables one to efficiently store sparse matrices, to take advantage of the block-diagonal structure when applying linear solvers, and to implement adaptivity.

Figure 5:
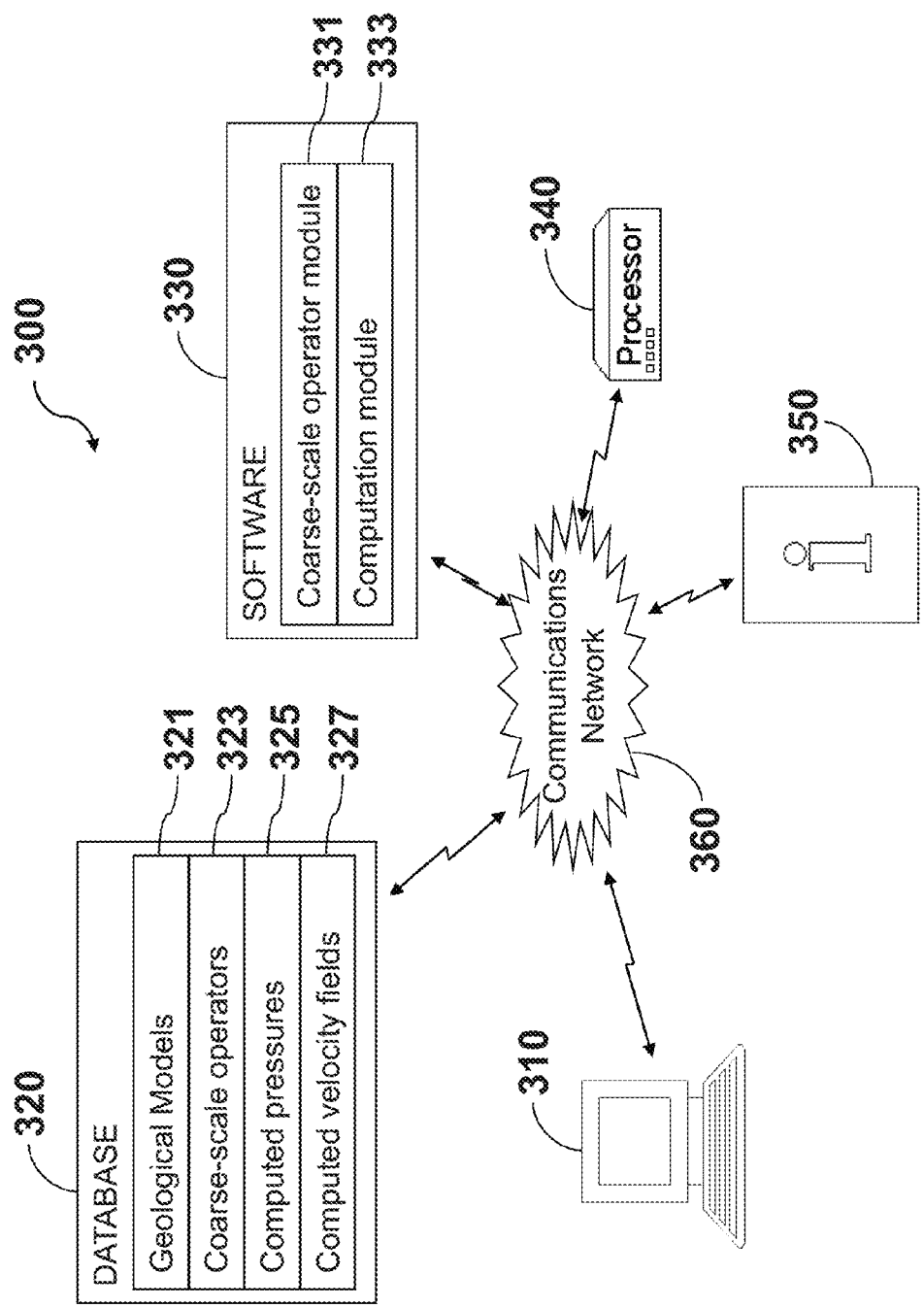
FIG. 5 is a schematic diagram of a system that can perform a multi-scale finite volume method, in accordance with the present invention.

FIG. 5 illustrates a system 300 that can be used in simulating a fine-scale geological model of a subsurface reservoir as described by the multi-scale finite volume method above. System 300 includes user interface 310, such that an operator can actively input information and review operations of system 300. User interface 310 can be any means in which a person is capable of interacting with system 300 such as a keyboard, mouse, or touch-screen display. Input that is entered into system 300 through user interface 310 can be stored in a database 320. Additionally, any information generated by system 300 can also be stored in database 320. For example, database 320 can store user-defined parameters, as well as, system generated computed solutions. Accordingly, geological models 321, coarse-scale operators 323, computed pressure solutions 325, and computed velocity field solutions 327, are all examples of information that can be stored in database 320.

System 300 includes software 330 that is stored on a processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, software 330 can include a plurality of modules for performing system tasks such as performing the multi-scale finite volume method previously described herein. Processor 340 interprets instructions to execute software 330, as well as, generates automatic instructions to execute software for system 300 responsive to predetermined conditions. Instructions from both user interface 310 and software 330 are processed by processor 340 for operation of system 300. In some embodiments, a plurality of processors can be utilized such that system operations can be executed more rapidly.

Examples of modules for software 330 include, but are not limited to, coarse-scale operator module 331 and computation module 333. Coarse-scale operator module 331 is capable of constructing coarse-scale operator 323. Computation module 333 is capable of computing pressure in the dual coarse-scale cells responsive to coarse-scale operator 323. Computation module 333 is also capable of computing pressure in the primary coarse-scale cells responsive to the pressure in the dual coarse-scale cells. Pressures in the dual coarse-scale cells and primary coarse-scale cells are examples of computed pressures 325 that can be stored in database 320. In some embodiments, computation module 333 computes a conservative velocity field from the pressure in the primary coarse-scale cells. The conservative velocity field is an example of a computed velocity field 327 that can be stored in database 320.

In certain embodiments, system 300 can include reporting unit 350 to provide information to the operator or to other systems (not shown). For example, reporting unit 350 can be a printer, display screen, or a data storage device. However, it should be understood that system 300 need not include reporting unit 350, and alternatively user interface 310 can be utilized for reporting information of system 300 to the operator.

Communication between any components of system 300, such as user interface 310, database 320, software 330, processor 340 and reporting unit 350, can be transferred over a communications network 360. Communications network 360 can be any means that allows for information transfer. Examples of such a communications network 360 presently include, but are not limited to, a switch within a computer, a personal area network (PAN), a local area network (LAN), a wide area network (WAN), and a global area network (GAN). Communications network 360 can also include any hardware technology used to connect the individual devices in the network, such as an optical cable or wireless radio frequency.

In operation, an operator initiates software 330, through user interface 310, to perform the multi-scale finite volume method. Outputs from each software module, such as coarse-scale operator module 331 and computation module 333, can be stored in database 320. Software 330 utilizes coarse-scale operator module 331 to construct coarse-scale operator 323. Once the coarse-scale operator 323 is constructed, the computation module 333 can retrieve coarse-scale operator 323 from either database 320 or directly from coarse-scale operator module 331 and compute the pressure in the dual coarse-scale cells. Computation module 333 also computes the pressure in the primary coarse-scale cells based on the pressure in the dual coarse-scale cells. A visual display can be produced using the pressure in the primary coarse-scale cells. For example, pressure distributions, velocity fields, or fluid flow within the reservoir can be displayed.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A multi-scale finite volume method for use in simulating a fine-scale geological model of a subsurface reservoir, the method comprising:
    (a) providing a fine-scale geological model of a subsurface reservoir associated with a fine-scale grid having a plurality of fine-scale cells;
    (b) defining a primary coarse-scale grid having a plurality of primary coarse-scale cells;
    (c) defining a dual coarse-scale grid having a plurality of dual coarse-scale cells, the dual coarse-scale grid defining a portion of the fine-scale cells as internal cells, edge cells, and node cells;
    (d) constructing a block upper triangular multi-scale matrix where blocks of the block upper triangular multi-scale matrix are ordered responsive to the internal cells, edge cells, and node cells;
    (e) computing pressure in the dual coarse-scale cells using a coarse-scale operator, the coarse-scale operator being a multi-diagonal block of the block upper triangular multi-scale matrix;
    (f) computing pressure in the primary coarse-scale cells responsive to the pressure in the dual coarse-scale cells;
    (g) producing a display responsive to the pressure in the primary coarse-scale cells; and
    wherein in steps (e) and (f) an iterative scheme is applied that modifies a coarse-scale source term and utilizes an inverse multi-scale matrix.

2. The method of claim 1, wherein the edge cells are fine-scale cells having an interface traversing therethrough, the interface being a transition between adjacent dual coarse-scale cells.

3. The method of claim 2, wherein the node cells are edge cells having portions of at least two interfaces traversing therethrough.

4. The method of claim 1, wherein the node cells are fine-scale cells having portions of at least two interfaces traversing therethrough, the at least two interfaces being transitions between adjacent dual coarse-scale cells.

5. The method of claim 1, wherein the internal cells are fine-scale cells free of an interface between adjacent dual coarse-scale cells.

6. The method of claim 1, wherein the computed pressures in the primary coarse-scale cells converge to a fine-scale pressure solution.

7. The method of claim 1, wherein mass balance is maintained on the primary coarse-scale grid.

8. The method of claim 1, wherein in step (e) the computing pressure in the dual coarse-scale cells using the coarse-scale operator comprises:
computing pressures within the node cells; and
prolongating the pressures within the node cells onto the fine-scale grid.

9. The method of claim 1, wherein a conservative velocity field is computed responsive to the pressure in the primary coarse-scale cells.

10. The method of claim 1, wherein in step (d) the coarse-scale operator is constructed using a permutation matrix and a prolongation operator.

11. The method of claim 1, wherein in step (f) the pressure in the primary coarse-scale cells is computed using a permutation operator defined by the primary coarse-scale grid.

12. The method of claim 1, wherein in step (g) the display comprises a representation of one of the following selected from the group consisting of pressure distributions, velocity fields, and fluid flow within the subsurface reservoir.

13. A multi-scale finite volume method for use in simulating a fine-scale geological model of a subsurface reservoir, the method comprising:
(a) providing a fine-scale geological model of a subsurface reservoir associated with a fine-scale grid having a plurality of fine-scale cells;
(b) defining a primary coarse-scale grid having a plurality of primary coarse-scale cells;
(c) defining a dual coarse-scale grid having a plurality of dual coarse-scale cells such that adjacent dual coarse-scale cells form an interface that traverses some of the fine-scale cells, the fine-scale cells that are traversed by a single interface are defined as edge cells, the fine-scale cells that are traversed by portions of at least two interfaces are defined as node cells, and the fine-scale cells that are free of the interface are defined as internal cells;
(d) computing pressure in the dual coarse-scale cells by:
(i) computing pressures within the node cells using a coarse-scale operator, the coarse-scale operator being a multi-diagonal block of a block upper triangular multi-scale matrix; and
(ii) prolongating the pressures within the node cells onto the fine-scale grid;
(e) computing pressure in the primary coarse-scale cells responsive to the pressure in the dual coarse-scale cells;
(f) producing a display responsive to the pressure in the primary coarse-scale cells; and
wherein in steps (d) and (e) an iterative scheme is applied that modifies a coarse-scale source term and utilizes an inverse multi-scale matrix.

14. The method of claim 13, wherein the computed pressures in the primary coarse-scale cells converge to a fine-scale pressure solution and mass balance is maintained on the primary coarse-scale grid.

15. The method of claim 13, wherein the display in step (f) comprises a representation of one of the following selected from the group consisting of pressure distributions, velocity fields, and fluid flow within the subsurface reservoir.

16. A system for use in simulating a fine-scale geological model of a subsurface reservoir, the system comprising:
a database configured to store data comprising a fine-scale geological model of a subsurface reservoir, a fine-scale grid having a plurality of fine-scale cells, a primary coarse-scale grid having a plurality of primary coarse-scale cells, a dual coarse-scale grid having a plurality of dual coarse-scale cells, and a coarse-scale operator;
a computer processor configured to receive the stored data from the database, and to execute software responsive to the stored data;
a software program executable on the computer processor, the software program comprising:
(a) a coarse-scale operator module that constructs the coarse-scale operator, the coarse-scale operator being a multi-diagonal block of a block upper triangular multi-scale matrix; and
(b) a computation module that computes pressure in the dual coarse-scale cells responsive to the coarse-scale operator, computes pressure in the primary coarse-scale cells responsive to the pressure in the dual coarse-scale cells, and applies an iterative scheme that modifies a coarse-scale source term and utilizes an inverse multi-scale matrix; and
a visual display for displaying system outputs.

17. The system of claim 16, wherein the coarse-scale operator module constructs the coarse-scale operator responsive to internal cells, edge cells, and node cells defined on the fine-scale grid by the dual coarse-scale grid.

18. The system of claim 16, wherein the computation module computes pressure in the dual coarse-scale cells by computing pressures within node cells and prolongating the pressures within the node cells onto the fine-scale grid.

19. The system of claim 16, wherein the computation module further computes a conservative velocity field responsive to the pressure in the primary coarse-scale cells.

* * * * *